United States Patent
Xu et al.

(10) Patent No.: US 12,417,261 B2
(45) Date of Patent: Sep. 16, 2025

(54) VISUALIZATION SYSTEM AND METHOD FOR INTERPRETATION AND DIAGNOSIS OF DEEP NEURAL NETWORKS

(71) Applicant: Robert Bosch GmbH, Stuttgart (DE)

(72) Inventors: Panpan Xu, Santa Clara, CA (US); Liu Ren, Saratoga, CA (US); Zhenge Zhao, Tuscon, AZ (US)

(73) Assignee: Robert Bosch GmbH (DE)

( * ) Notice: Subject to any disclaimer, the term of this patent is extended or adjusted under 35 U.S.C. 154(b) by 766 days.

(21) Appl. No.: 17/479,655

(22) Filed: Sep. 20, 2021

(65) Prior Publication Data
US 2023/0085927 A1  Mar. 23, 2023

(51) Int. Cl.
| | |
|---|---|
| *G06K 9/62* | (2022.01) |
| *G06F 3/0482* | (2013.01) |
| *G06F 3/0484* | (2022.01) |
| *G06F 18/40* | (2023.01) |
| *G06T 7/10* | (2017.01) |

(52) U.S. Cl.
CPC ............ *G06F 18/41* (2023.01); *G06F 3/0482* (2013.01); *G06F 3/0484* (2013.01); *G06T 7/10* (2017.01); *G06T 2207/20081* (2013.01); *G06T 2207/20084* (2013.01)

(58) Field of Classification Search
CPC ...... G06F 18/41; G06F 3/0482; G06F 3/0484; G06T 7/10; G06T 2207/20081; G06T 2207/20084; G06V 10/764; G06V 10/776; G06V 10/454; G06V 10/82; G06V 10/945; G06V 20/70
See application file for complete search history.

(56) References Cited

U.S. PATENT DOCUMENTS 11,017,019 B1 *  5/2021  Hohwald ................. G06N 3/08

OTHER PUBLICATIONS

Graziani M. et al., "Concept attribution: Explaining CNN decisions to physician" Computers in Biology and Medicine 123 (2020), pub. Jun. 17, 2020 (Year: 2020).*
Graziani et al., , "Concept attribution: Explaining CNN decisions to physician", pub. Jun. 17, 2020, (Year: 2020).*
Zhengqing, et al., "Concept-based Explanation for Fine-grained Images and Its Application in Infectious Keratitis Classification", pub. Dec. 16, 2020, (Year: 2020).*
Gonda et al., , "An Interactive Approach to Train Deep Neural Networks for Segmentation of Neuronal Structures", Pub. 2017. (Year: 2017).*
Graziani M. et al., "Concept attribution: Explaining CNN decisions to physician", pub. Jun. 17, 2020 (Year: 2020).*

(Continued)

*Primary Examiner* — Mekonen T Bekele
(74) *Attorney, Agent, or Firm* — Dickinson Wright PLLC

(57) ABSTRACT

A computer-implemented method includes receiving one or more images from one or more sensors, creating one or more image patches utilizing the one or more images, creating one or more latent representations from the one or more image patches via a neural network, outputting, to a concept extractor network, the one or more latent representations utilizing the one or more image patches, defining one or more scores associated with the one or more latent representations, and outputting one or more scores associated with the one or more image patches utilizing at least the concept extractor network.

20 Claims, 16 Drawing Sheets

(56) References Cited

OTHER PUBLICATIONS

Zhengqing Fang et al., "Concept-based Explanation for Fine-grained Images and Its Application in Infectious Keratitis Classification", pub. Dec. 16, 2020 (Year: 2020).*

Gonda et al., "An Interactive Approach to Train Deep Neural Networks for Segmentation of Neuronal Structures", Pub. Pub. 2017, (Year: 2017).*

B. Kim, M. Wattenberg, J. Gilmer, C. J. Cai, J. Wexler, F. B. Viegas, and R. Sayres. Interpretability beyond feature attribution: Quantitative testing with concept activation vectors (tcav). In ICML, 2017.

L. van der Maaten and G. Hinton. Visualizing high-dimensional data using t-sne. Journal of Machine Learning Research, 9:2579-2605, 2008.

* cited by examiner (A) ResNet-101

(B) DenseNet-FCN

VISUALIZATION SYSTEM AND METHOD FOR INTERPRETATION AND DIAGNOSIS OF DEEP NEURAL NETWORKS

TECHNICAL FIELD

The present disclosure relates to system associated with a machine learning network, such as a deep neural network.

BACKGROUND

Model developers may encounter different problems while diagnosing their model to make improvements. Developers may want to understand predictions and find the leading causes of a specific result. For example, if a classification model predicts an image as a "fish", the developer may determine if the mis-clasification is due to the system recognizing the fish body, or is it using contextual cues in the image such as a human holding it or a container carrying the fish. Another main concern is the identification of systematic causes of misclassification. When developing a semantic segmentation model for analyzing scenes in an application, developers may find that certain objects may be incorrectly detected under certain attributes, like a shadow under a tree. Determining if this is a systematic issue may help the developers better understand and anticipate the model behavior, but also helps them develop effective strategies to refine the model and improve its performance.

SUMMARY

According to a first embodiment, a computer-implemented method includes receiving one or more images from one or more sensors, creating one or more image patches utilizing the one or more images, creating one or more latent representations from the one or more image patches via a neural network, outputting, to a concept extractor network, the one or more latent representations utilizing the one or more image patches, defining one or more scores associated with the one or more latent representations, and outputting one or more scores associated with the one or more image patches utilizing at least the concept extractor network.

According to a second embodiment, a computer-implemented method includes receiving one or more images from one or more sensors, creating one or more image patches utilizing the one or more images, creating one or more latent representations from the one or more image patches via a neural network, outputting, to a concept extractor network, one or more latent representations utilizing the one or more image patches and a plurality of models associated with the concept extractor network, and outputting, to a user interface, one or more scores associated with the plurality of models associated one or more attributes of the image patches utilizing the concept extractor network.

According to a third embodiment, a system includes a processor in communication with a display. The processor is programmed to receive one or more images from one or more sensors, create one or more image patches utilizing the one or more images, send the one or more image patches to a neural network to define one or more latent representations utilizing the one or more image patches, output, to a concept extractor network, the one or more latent representations utilizing the one or more image patches and a plurality of models associated with the concept extractor network; and output, to a user interface on the display, one or attributes associated with the one or more image patches and the plurality of models.

DETAILED DESCRIPTION

Figure 1:
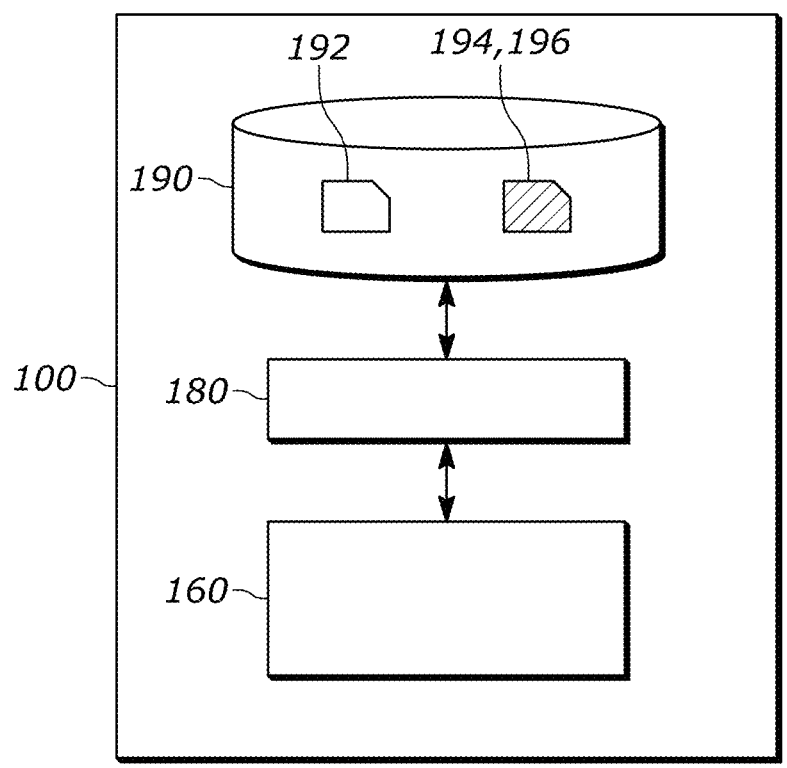
FIG. 1 illustrates a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Deep neural networks have achieved state-of-the-art performance in many challenging computer vision tasks and are being widely adopted in many real-world application scenarios such as autonomous driving. As a result, recent emphasis on deep learning models has moved from model accuracy alone towards issues such as model interpretability. The machine learning community has realized the necessity of making the models more understandable, especially since these models can easily have hundreds of millions of parameters with highly non-linear transformations. First of all, the model/application developers might want to scrutinize the decisions made by machine learning models and use them more responsibly. If the model developers can understand the weaknesses of their AI models, they could minimize the potential errors or biases of training data in real-world applications. The method may be orthogonal to model accuracy, as increasing AI accuracy may not bring the same improvements for performance if the human cannot develop insights into the AI system. Secondly, improving model interpretability can facilitate model refinement.

In on example, when designing AIs for autonomous driving, the detection of unexpected road hazards, such as lost cargo is a typical image segmentation task in computer vision. When model developers train a neural network like Fully Convolutional Network (FCN) or DeepLabV3 for lost-cargo detection, the accuracy may be relatively low and the developers have difficulties in finding potential root causes, which could be the lighting conditions on the road, the visual features of the lost-cargo objects themselves or others. Identifying such potential root causes can help develop mitigation strategies (e.g., applying appropriate data augmentations) to further improve the model, and model interpretation is the key to discover such root causes.

To tackle the issue of interpretability in neural networks, many techniques have been proposed to help people understand model predictions. TCAV (Testing with Concept Activation Vectors) and the follow-up work ACE aim to understand what signals the model uses for predicting different image labels. They generate a measure of importance of a visual concept (e.g. wheel, glass) for a prediction (e.g. predicted as a car) in a trained model. However, the concepts generated by automatic clustering methods may not match human concepts.

In other words, such methods cannot guarantee that image patches which are relatively close and gathered in a latent space are semantically meaningful to humans as a concept. This mismatch provides the inspiration for our work. The system and method may propose a visual analytics framework to integrate human knowledge in the visual concept extraction process and use the identified concepts to analyze potential causes of model errors and develop mitigation strategies. Specifically, the system may propose a novel combination of an active learning process with a user interface expressly designed for fast labeling of images to train a concept extractor network that identifies patches containing a common concept. The system's ConceptExtract enables users to explore image patches, control the active learning process and use the resulting concepts for model comparison and diagnosis. The system may present example usage scenarios for different datasets and machine learning tasks, including image classification for ImageNet and image segmentation for the lost cargo challenge. The system and method may analyze a variety of neural network architectures, including ResNet, VGG (Visual Geometry Group), FCN, and DeepLabV3, demonstrating the generality of our proposed approach. Using ConceptExtract, users can extract semantically meaningful concepts, provide concept-based explanations for different machine learning models and compare them. Such an approach may produce concept extractors accurately and more efficiently than random labeling or traditional active learning approaches. Furthermore, the method and system may show the validity of the concepts extracted by following up the concept extraction procedure with an associated data augmentation strategy that improves the performance of model under analysis.

In summary, the embodiments may be a novel visual analytics framework supporting a human-in-the loop, active learning based approach to extract visual concepts for model interpretation, as well as identifying visual concepts that negatively affect model performance of the network. A system in an embodiment may include the human-in-the loop workflow, featuring scalable image patch exploration, visual cues and interactive filters for active learning and a rich set of model diagnostics and comparative analysis visualizations. The value of using ConceptExtract for diverse machine learning tasks and datasets may produce concepts faster than traditional active learning, and that these concepts can help develop data augmentation strategies for model performance improvement.

In one embodiment, a system may utilize neural networks whose first layer has as many units as there are pixels in the input image. To exploit spatial locality, current deep neural networks (DNNs) may use convolutional layers, typically followed by nonlinear activation functions. After a sequence of such layers, a fully-connected layer is usually present before the model output. This basic setup can be used in various tasks by assembling different layers, each potential configuration is called an architecture.

To obtain image patches that potentially contain the same concept, the system may need some approach to measure image similarity. However, direct pixel difference measurements fail to take into account misalignment, distortions, lighting changes, and so on. To solve this problem, the system may utilize deep embeddings as a representation of the image patches. As an image is passed as an input through a DNN model, the output after each hidden layer is an embedding in that latent space. These deep embeddings provide hints for the model to distinguish different images. Previous work shows that euclidean distance1 in the latent space is an effective perceptual similarity metric. In an embodiment, the method and system may fresize inputs to match the architecture's first layer and choose the embeddings from a low-dimensional layer as the latent representation.

Active learning is a semi-supervised machine learning method where the learning algorithm can interactively query a user for labeling instances. Instead of manually labeling all the unlabeled instances, active learning makes a priority to label the data that have the highest impact on training the model. This method may be used in training neural networks. Commonly used prioritizing methods include model confidence, margin sampling, and entropy. Once an approach has been chosen to prioritize the labeling, this process can be iteratively repeated: a small subset of data with the highest prioritization scores will be presented to the user to assign labels. After that, the DNN can be trained on the manually labeled data. Once the model has been trained, the unlabeled data points can be run through the model to update their prioritization scores, which significantly reduces the overall labeling burden. Allowing a user to pick from a set of carefully laid-out images may produce a more efficient sequence of training models than is possible with pure sequential active learning.

In image classification, all possible categories are assumed to be known to the model, and images are typically assumed to belong to a single class. However, an image may be complex (for example, it can contain various objects and visual patterns). The system may refer to these "potential" labels of these objects as Concept Annotations or attributes. They are different from the classification labels, and an image may admit multiple concept annotations. Concept annotations are not used in training the network for the task, but they can provide the grounding necessary for model explanations.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
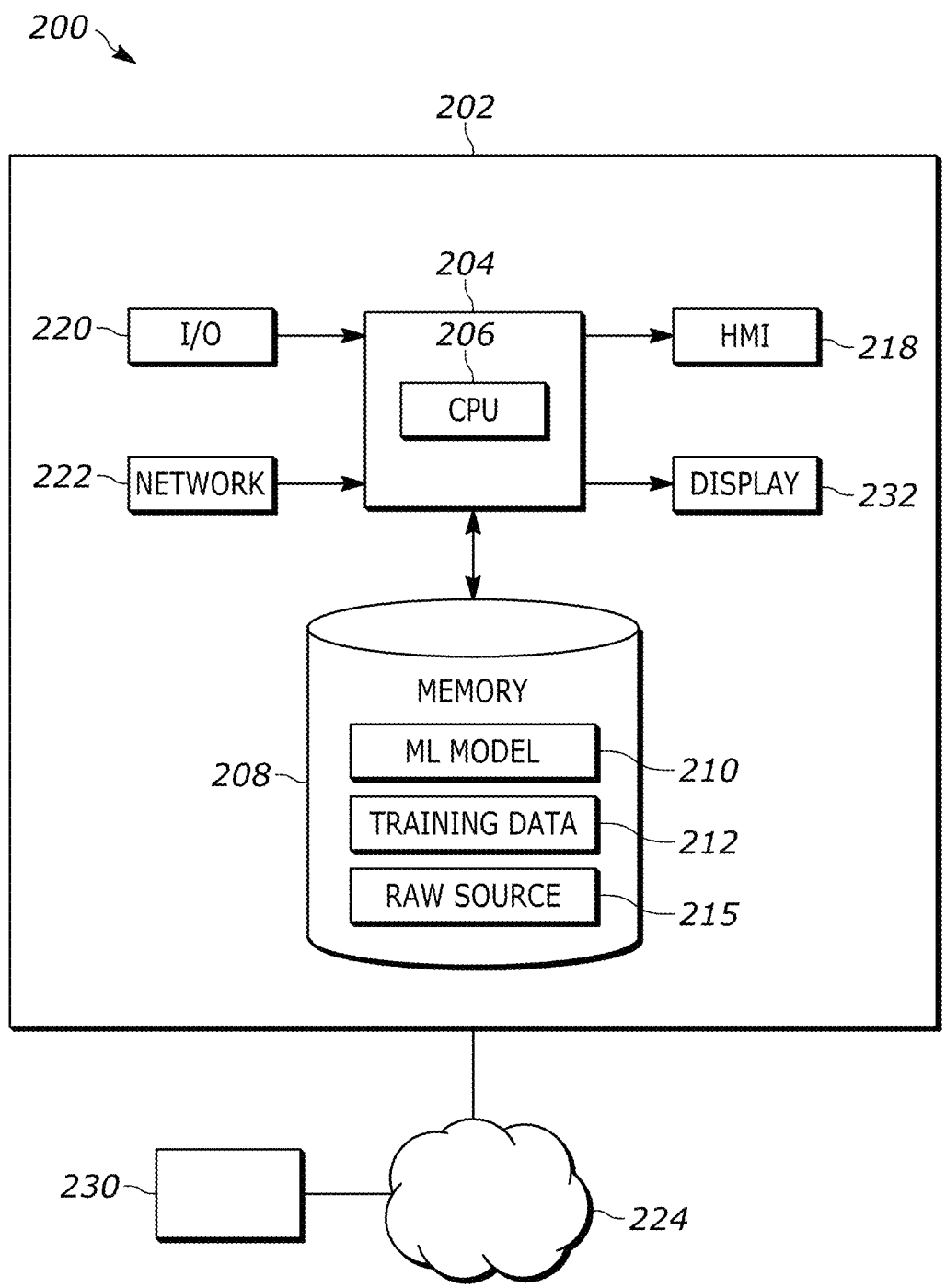
FIG. 2 illustrates a computer-implemented method 200 for training a neural network.

FIG. 2 depicts a data annotation system 200 to implement a system for annotating data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 215.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 330 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 215. The raw source dataset 215 may include raw or unprocessed sensor data that may be representative of an input dataset for a machine-learning system. The raw source dataset 215 may include video, video segments, images, text-based information, and raw or partially processed sensor data (e.g., radar map of objects). In some examples, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 215. The raw source data 215 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 215 to identify the presence of the particular features. The machine-learning algorithm 210 may be configured to identify a feature in the raw source data 215 as a predetermined feature (e.g., pedestrian). The raw source data 215 may be derived from a variety of sources. For example, the raw source data 215 may be actual input data collected by a machine-learning system. The raw source data 215 may be machine generated for testing the system. As an example, the raw source data 215 may include raw video images from a camera.

In the example, the machine-learning algorithm 210 may process raw source data 215 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
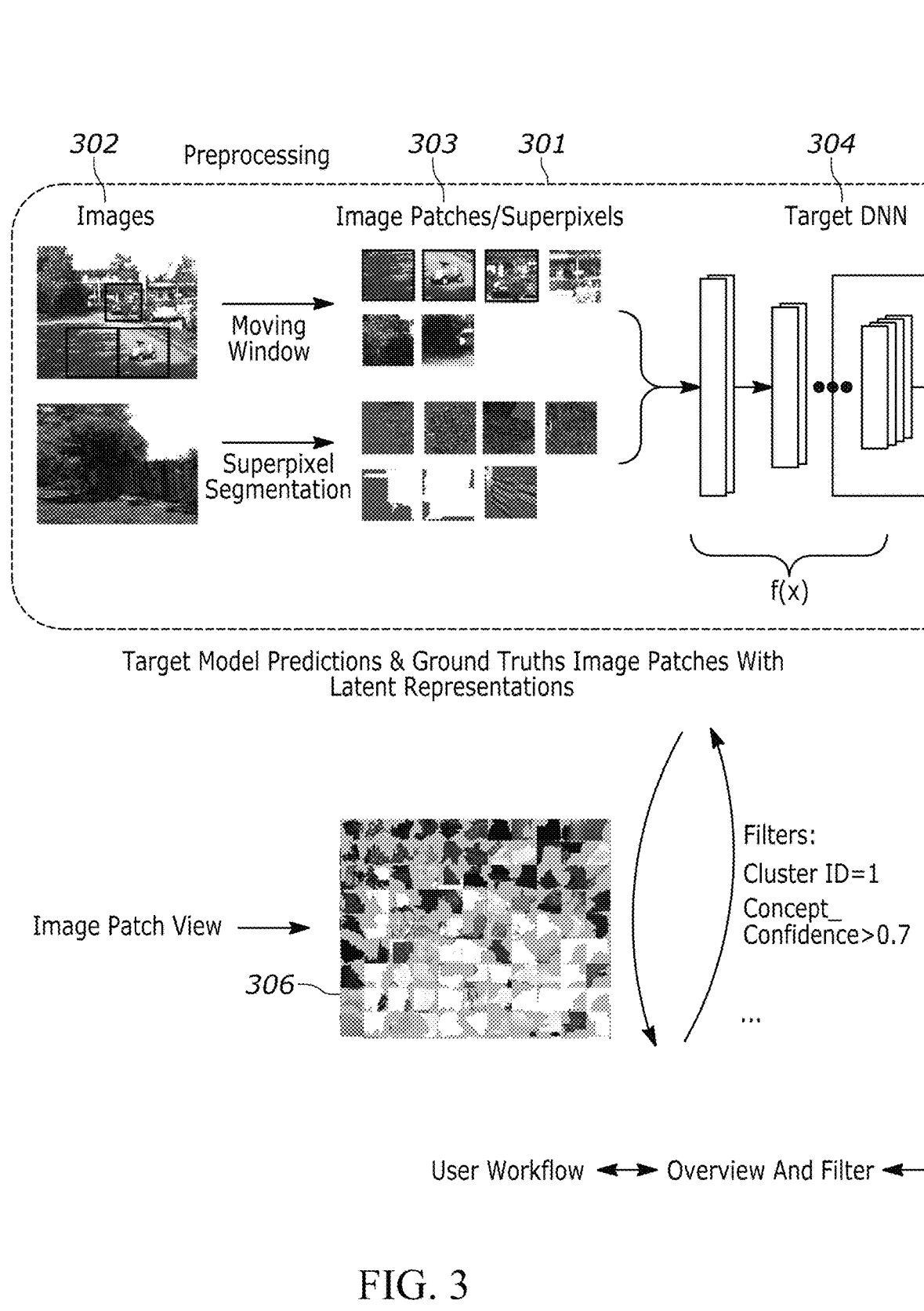
FIG. 3 illustrates an embodiment of a system utilizing the concept extraction.
Figure 3:
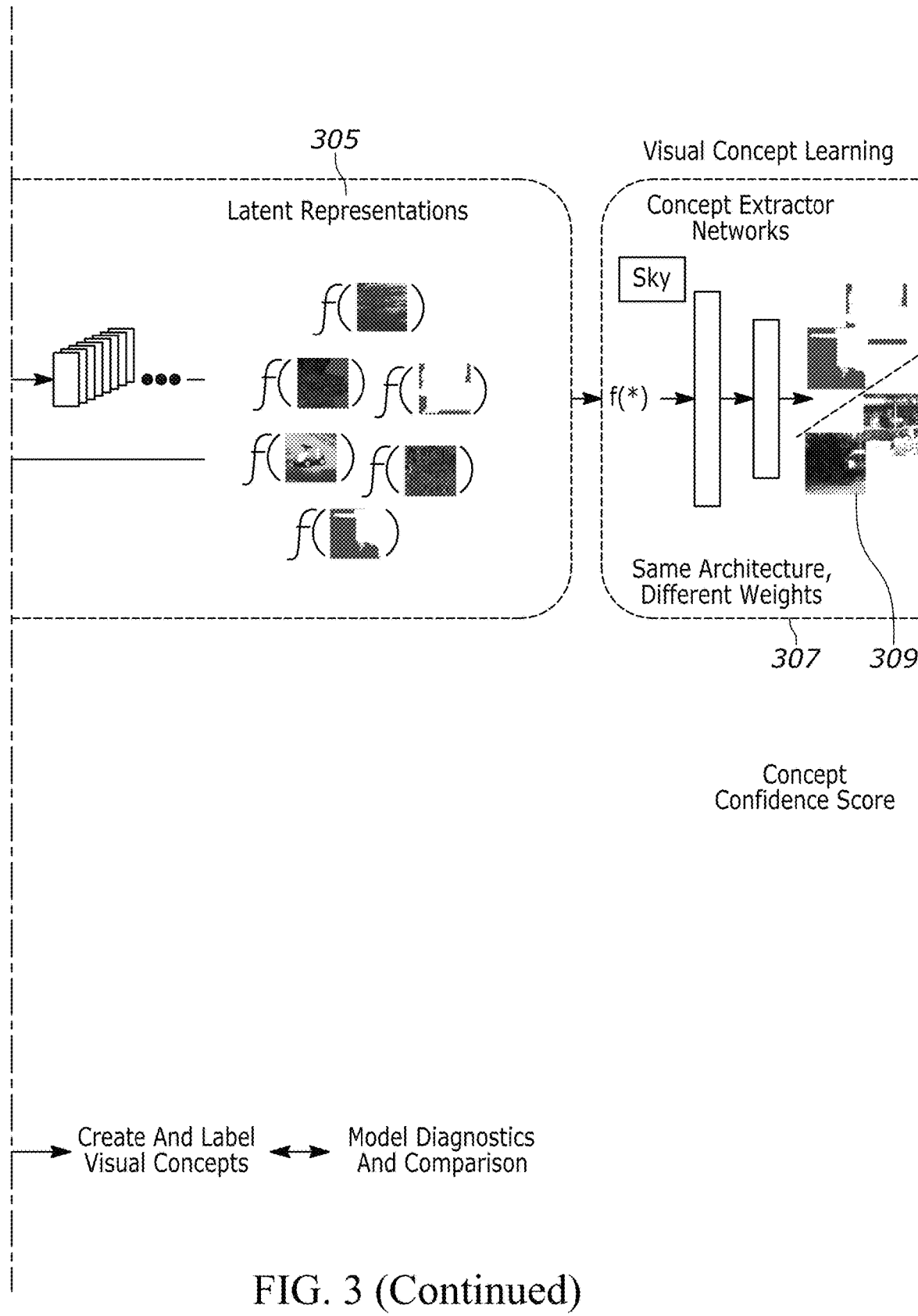
Figure 3:
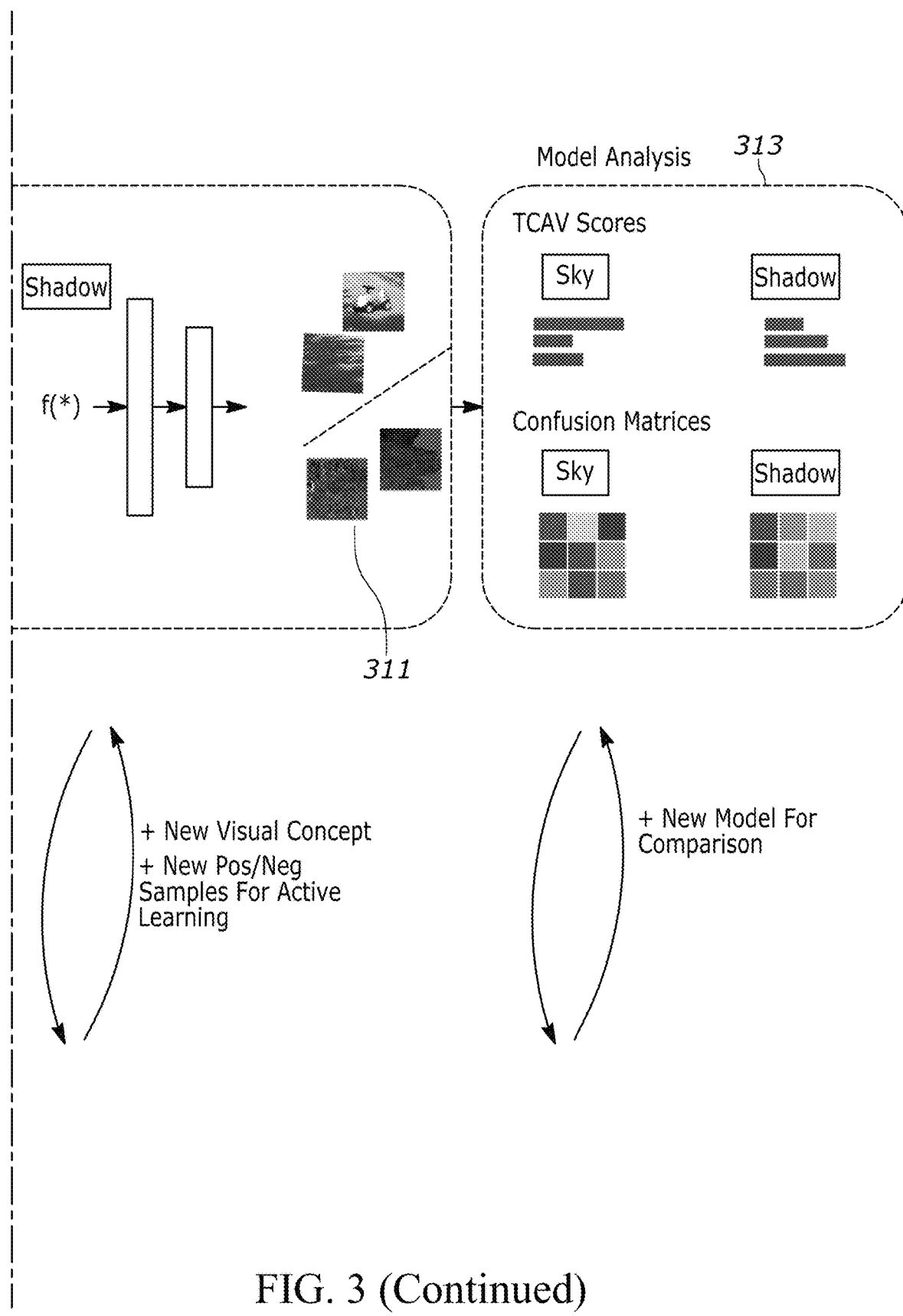

FIG. 3 discloses an illustrative embodiment of a system utilizing the concept extraction. With the system described that may utilize a ConceptExtract, the system may seek to provide model developers a visual analytic system so they can interpret, diagnose and compare deep learning models with human-friendly, concept-based explanations.

The system should provide a summary of the model to the developers to start with. Deep learning models can have different performance metrics depending on the task, e.g. precision in image classification model and IoU (Intersection over Union) accuracy in semantic segmentation models; prompt access to these measures is a requirement. The system may browse and explore image patches/super-pixels. It may be challenging for users even to know what visual concepts exist in the data. Since each dataset potentially contains many concepts, it is important for the user to be able to extract visual concepts that highly influence model decision. The system, therefore, needs to provide an overview of the image patches with a good layout strategy, as well as also provide a set of filters to help users quickly identify interesting data samples and decide which image patches to study first.

The system may also train and evaluate concept extraction models. Since no ground truth labels exist for visual concepts, and it is infeasible for users to manually label a large number of images, the system may utilize a separate concept extraction active learning loop to efficiently derive a set of image patches containing a visual concept. The system should involve users' human knowledge and give them the flexibility to choose and customize any potential concept they recognize in the image patches. It should also provide methods for the user to evaluate whether the model has sufficiently learnt the visual concept.

The system may analyze how visual concepts affect model decisions. After extracting human-friendly visual concepts, the system should support using them to understand model behavior. The system should help users systematically analyze how important the visual concepts are for predicting different classes and analyze how the presence of different visual concepts in images affects model performance (e.g. shadow prevents detection of objects on the road).

The system may compare different models. In addition to investigating the target model, the system may further support using the visual concepts extracted for fine-grained model comparison, esp. how the performance of the models differ on images containing different visual concepts. This may help reveal the strength and weaknesses of different models.

As shown in FIG. 3, the workflow may start with a preprocessing stage 301 with the available image data 302 and the target model 304. In the preprocessing stage, the original images 302 are segmented into patches 303 using fixed window sizes or super-pixel segmentation algorithms. The image patches/super-pixels 303 are then resized to the input scale and fed to the target model 304. The target model 304 may be a deep neural network or any other type of machine learning network. Their latent representations are extracted at a selected layer in the target model for visual concept learning. The visual concept learning stage 307 may utilize a concept extractor networks on top of the latent representations to learn human-understandable concepts and retrieve image patches containing those concepts for model analysis. For example, the system may extract various concepts from an image, such as the first concept 309 (e.g., "sky") or second concept 311 (e.g., "shadows"). The visual concept learning stage 307 may include individual networks with the same architecture but different weights that are trained to recognize different visual concepts (e.g., sky, shadows, faces, etc.) through an active learning process and learn any number of concepts.

In the preprocessing stage 301, the images 302 may be segmented into image patches 303 or super-pixels. The latent representations 305 of these image patches/super-pixels 303 may be extracted from a selected layer in the target model 304. The visualization interface layout the image patches such that similar patches are spatially close. Users can easily identify and create new visual concepts and overlay data such as target model misclassifications to focus on problematic cases. In the visual concept learning stage, the system and method may utilize concept extractor networks to retrieve image patches containing the same concept (sky and shadow in the figure). The concept extractor networks take the latent presentations of the image patches as inputs and output concept confidence scores in, which may be in a range between 0 and 1. The system may employ a visualization assisted active learning process to train the concept extractor networks. The learned visual concepts are used in the model analysis stage 313 for model interpretation and comparison with visualizations such as TCAV scores charts and confusion matrices.

To help users create meaningful novel visual concepts, the system provides an overview of the image patches and projects them in a way such that visually similar image patches are close to each other. The user can also interactively overlay a variety of information on top of the image patches such as accuracy, ground-truth and predicted labels to prioritize looking for visual concepts that affect model performance.

To support effective novel visual concept learning and reduce user labeling effort in the active learning process, the system and method may utilize a hybrid approach that tightly couples visualization and computational techniques. For each image patch, the concept extractor network produces a concept confidence score. The concept confidence score ranges from 0 to 1, where 0 is for confidently negative (the image patch does not contain the visual concept), 1 is for confidently positive (the image patch must contain the visual concept), and any decimal in between is for not sure. The system visualizes the concept confidence score and supports interactive data filtering based on it to help the users prioritize labeling more informative examples for model training. In particular, labeling hard negative samples, which are image patches confidently but wrongly classified, can greatly facilitate the training process. The user can also filter the image patches with the most confident predictions to verify if the concept extractor has been sufficiently trained to recognize visual concepts that align with human-knowledge. To further reduce user effort and recognize novel visual concepts with very few labeled examples provided by the user, the system may also use a data augmentation strategy which has been proven to be effective in similar scenarios such as few-shot learning or zero-shot learning. The data augmentation method selects each labeled image patch, randomly applies two categories of augmentation policies: (1) shape policies like shearing, flipping, rotating, and (2) color policies like gray-scaling and blurring.

After obtaining a set of visual concepts and the corresponding image patches, the user can move to the model analysis stage and perform model interpretation, diagnostics and comparison using TCAV scores and confusion matrices. The visualization interface may display fine-grained analysis, including how each visual concept affects the models and how the model performances differ on images containing different visual concepts. For example, different attributes of an image may have different effects for various models.

Figure 4:
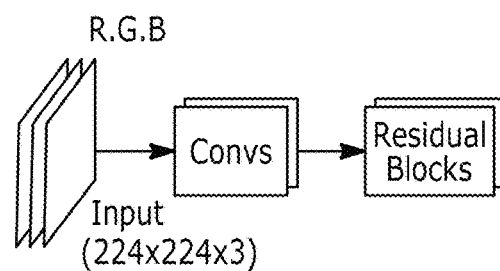
FIG. 4 illustrates an embodiment of an image patch view.
Figure 4:
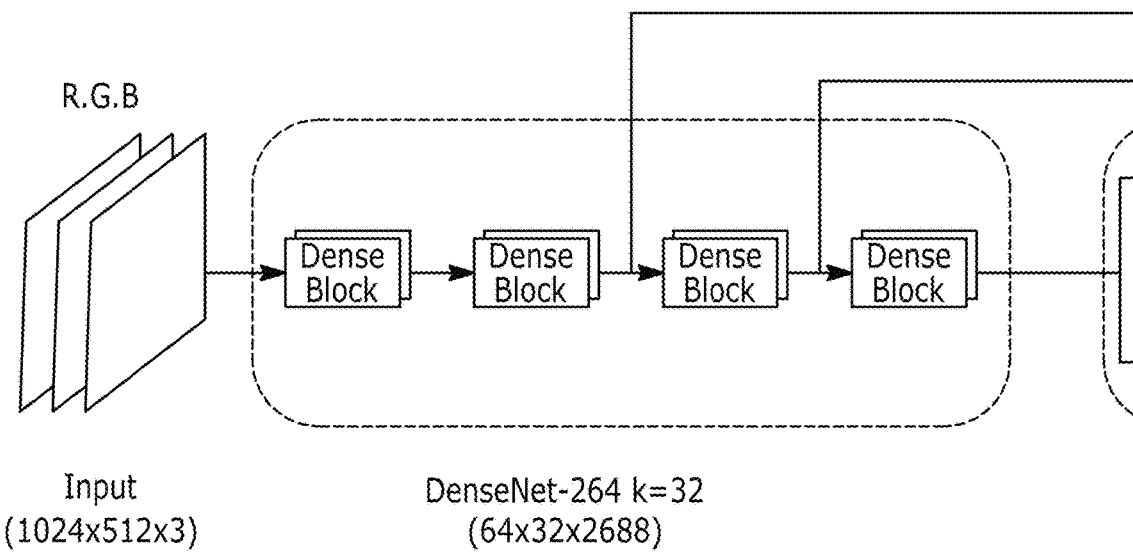
Figure 4:
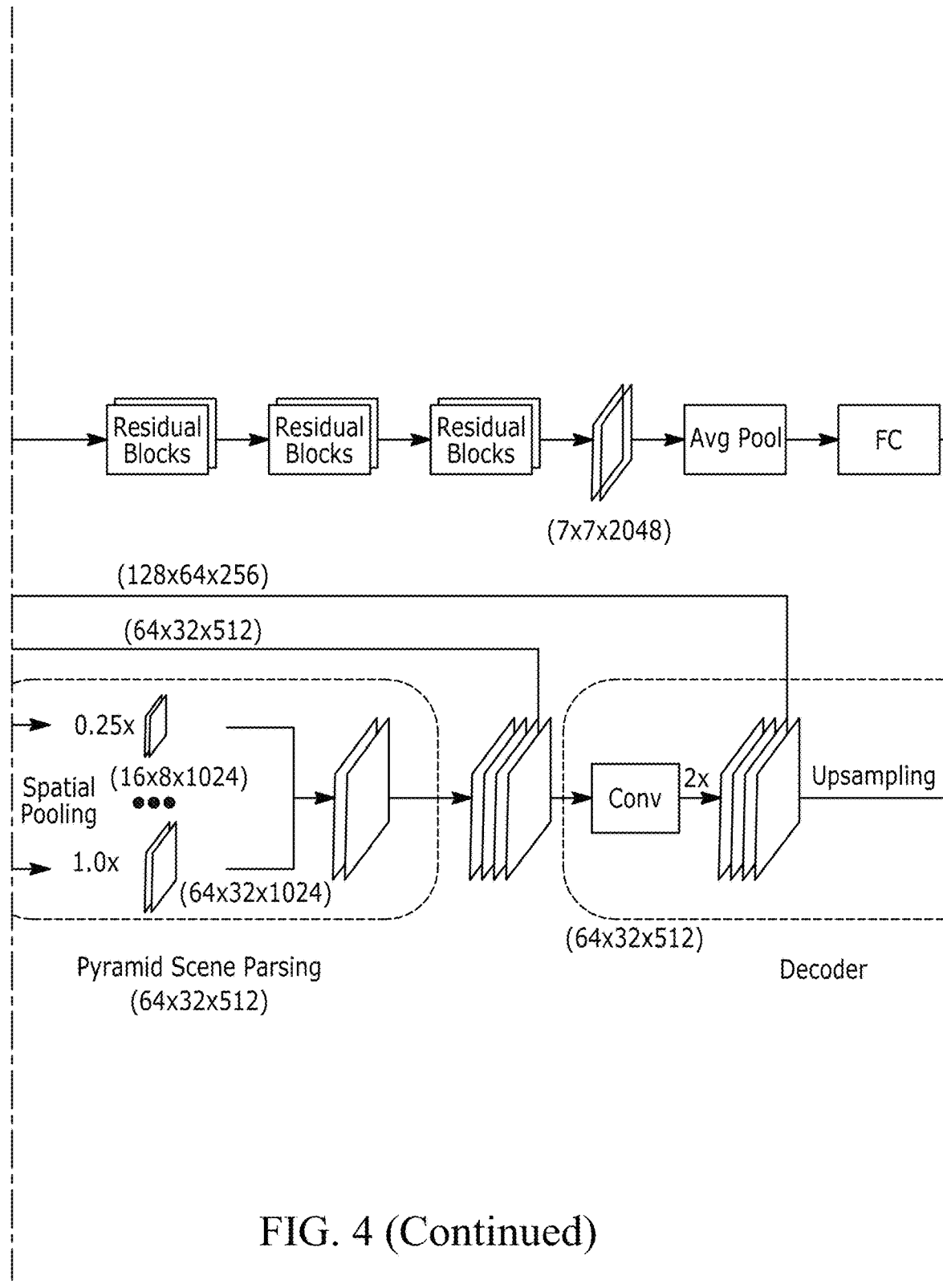
Figure 4:
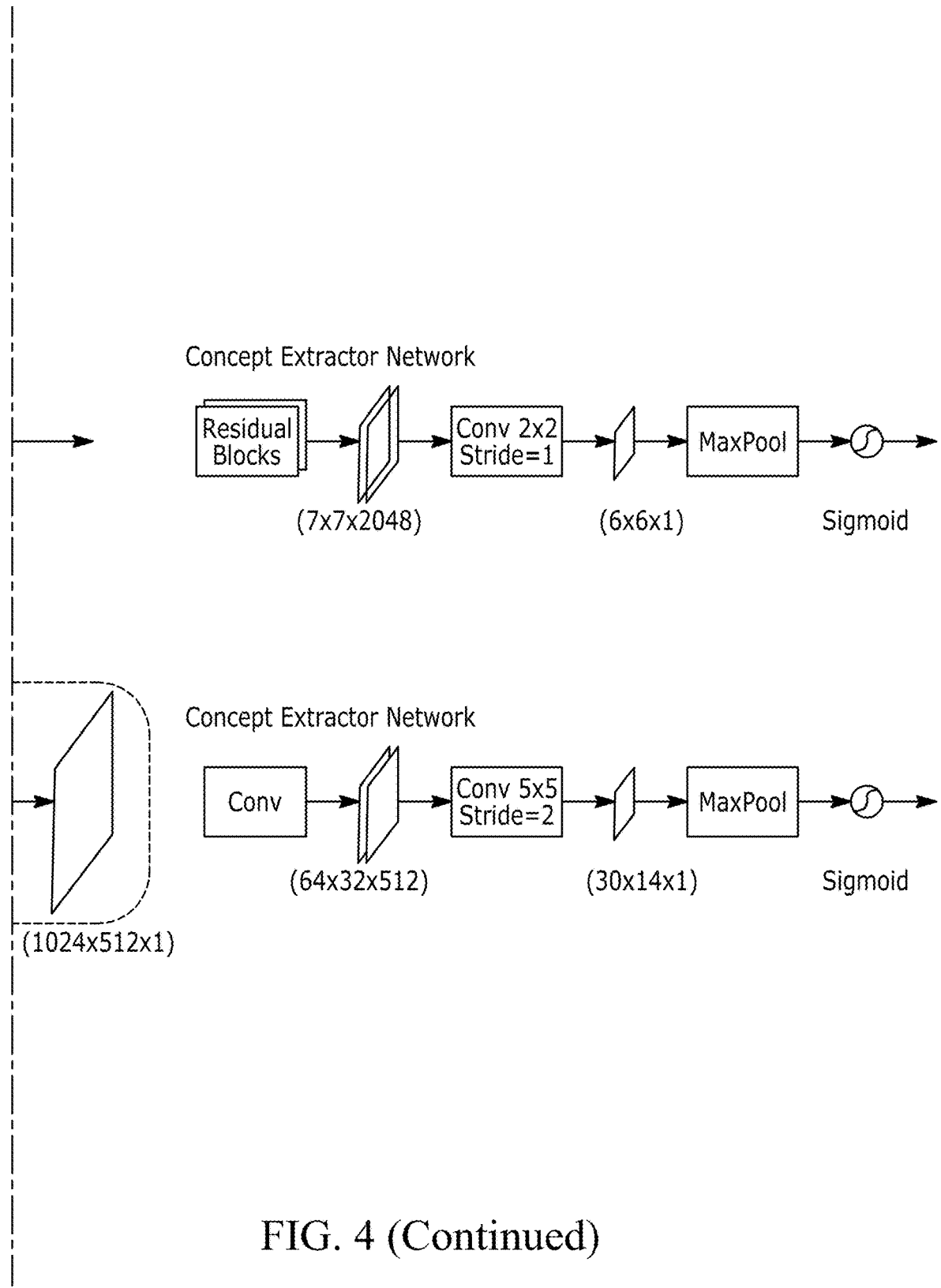

FIG. 4 is an illustrative embodiment of an image patch view. The system may apply ConceptExtract to analyze image classification and segmentation DNNs.

Figure 5:
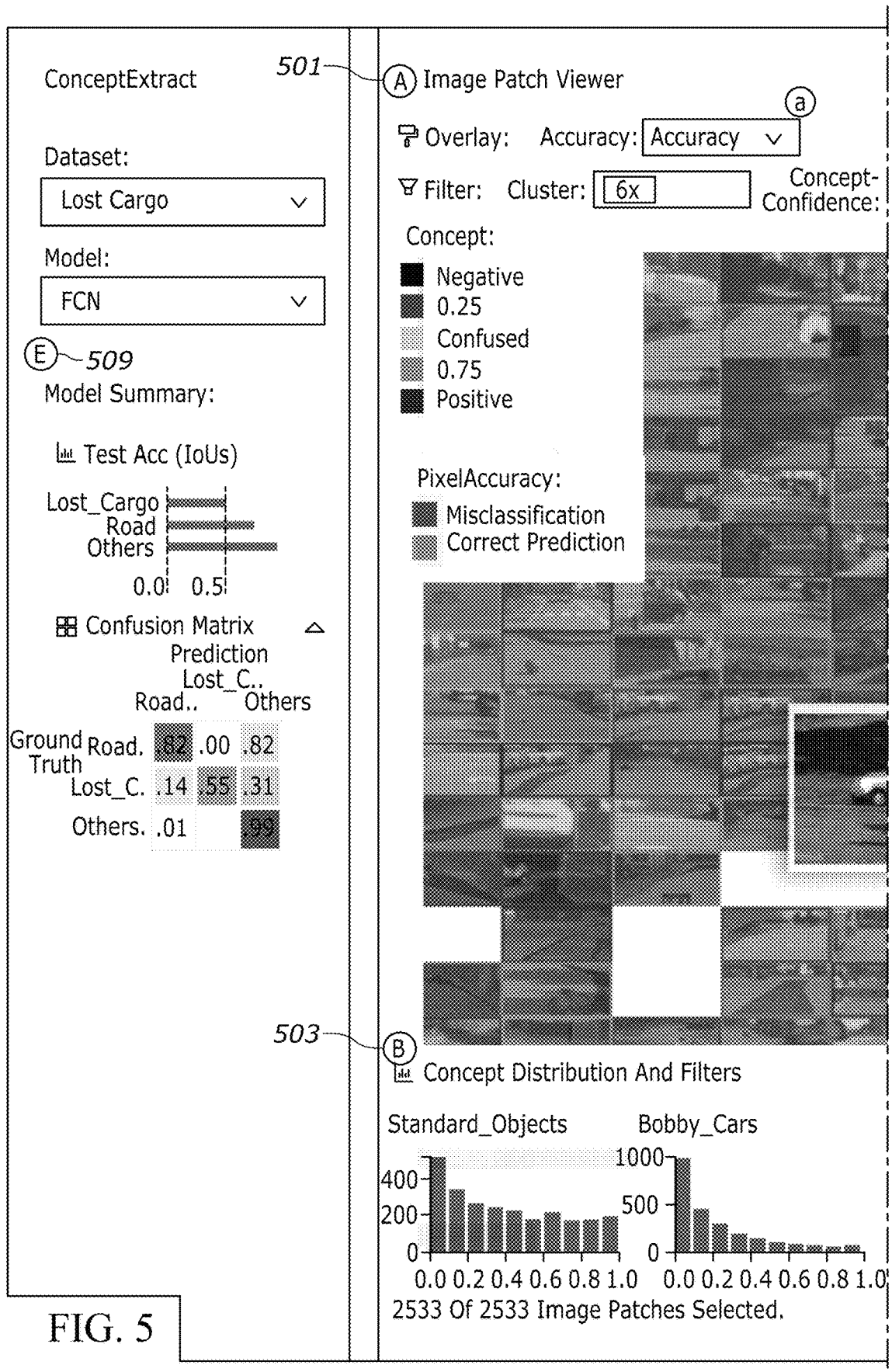
FIG. 5 illustrates a front end system that may include a user interface utilized to analyze various models of a network.
Figure 5:
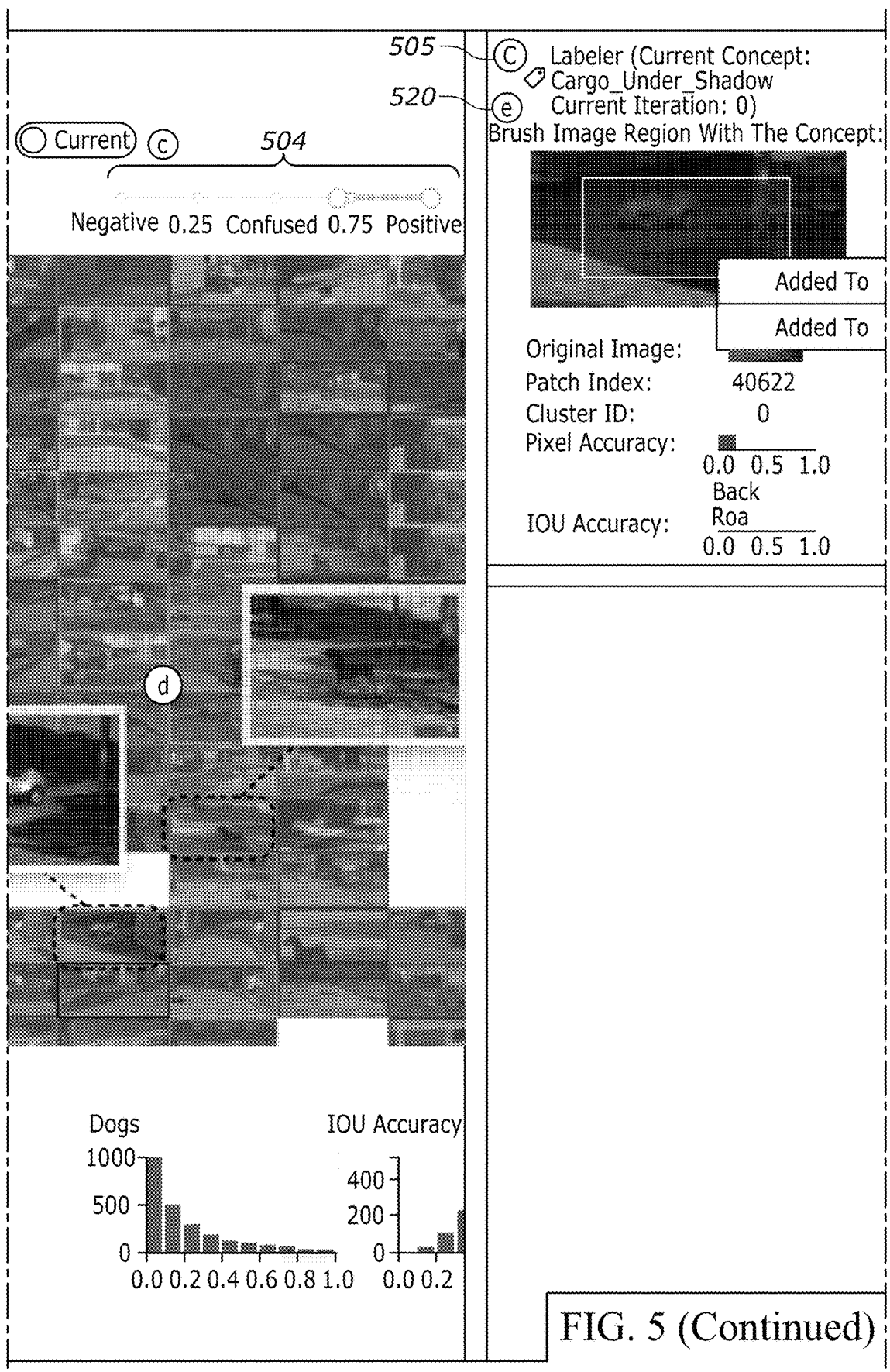
Figure 5:
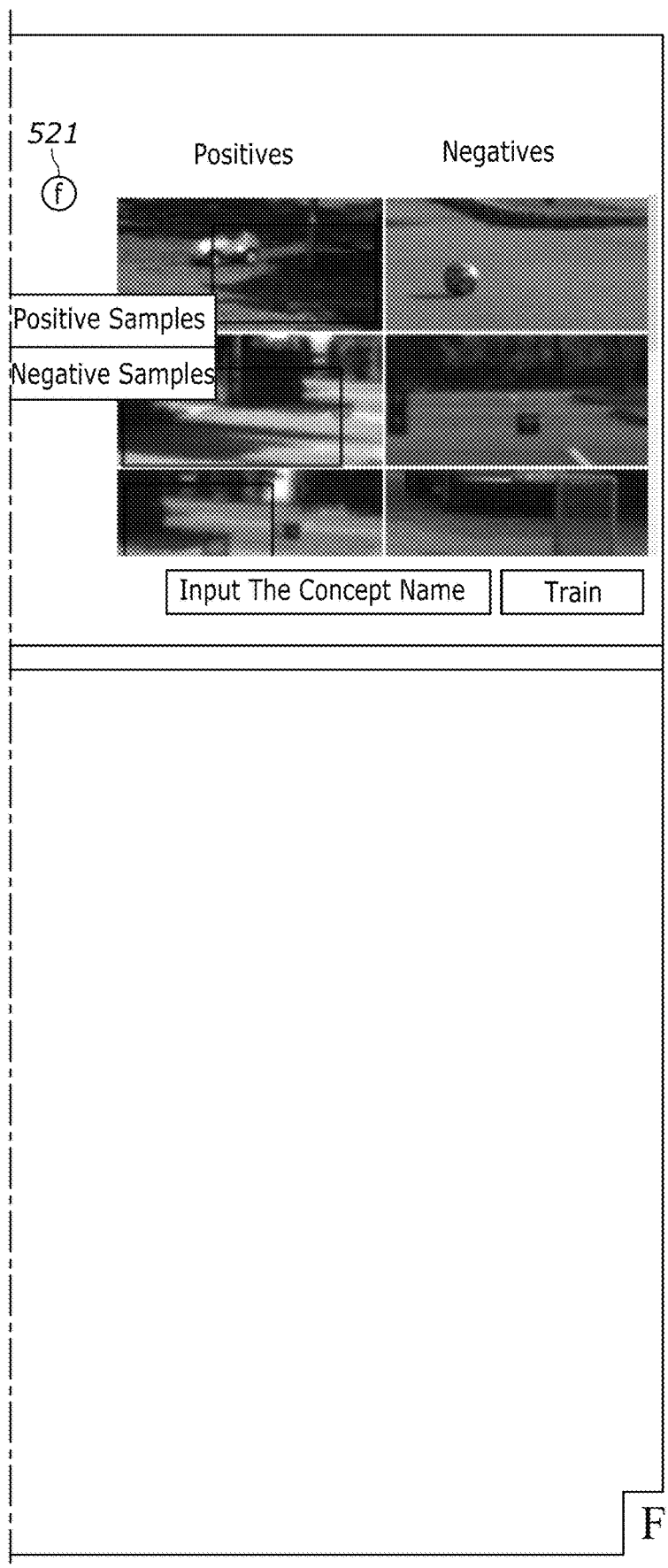
Figure 5:
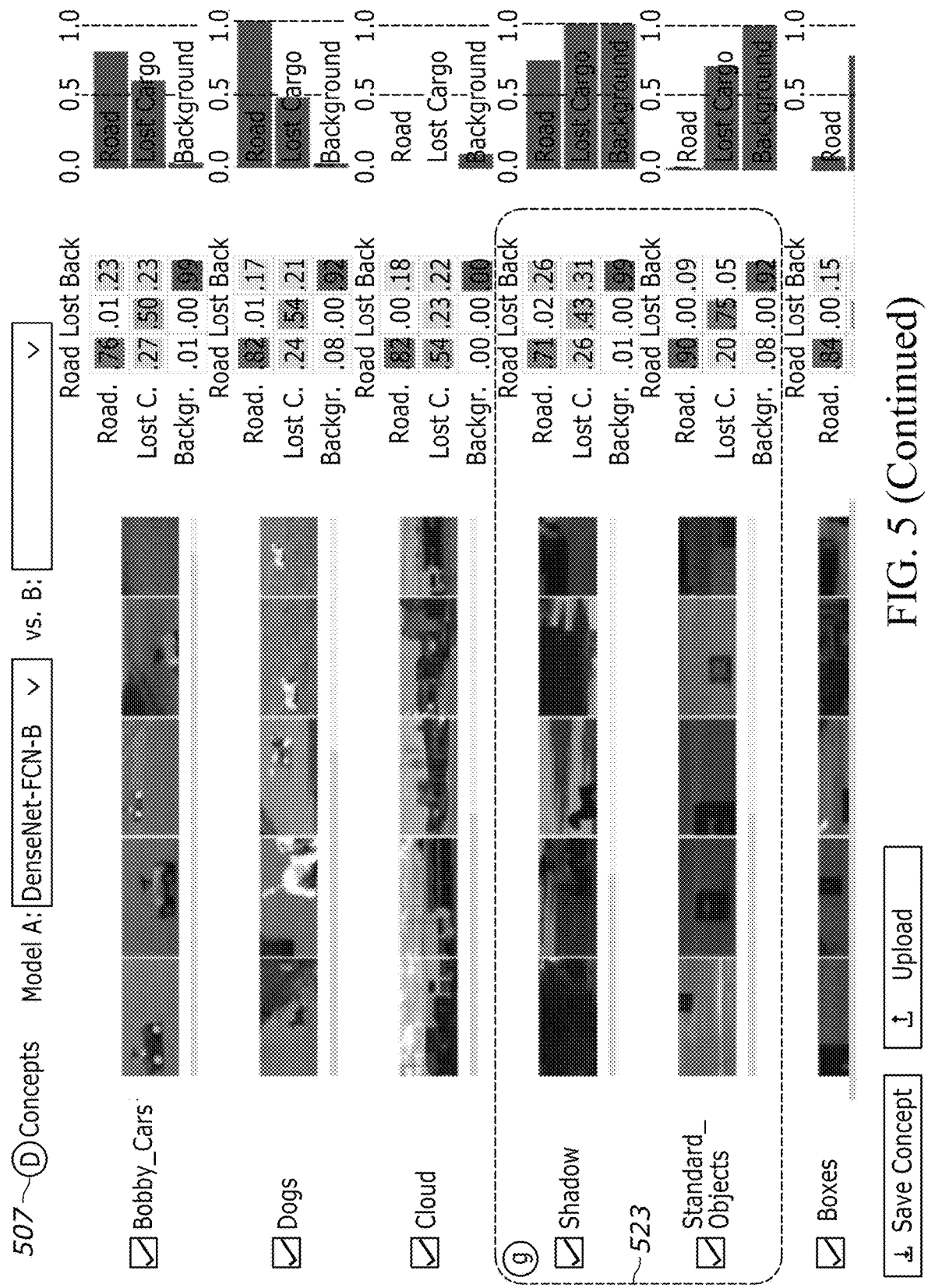

FIG. 5 illustrates a front end system that may include a user interface. The user interface make include a set of visualization modules to display information like a model summary, visual concept images, and a series of interactions to support image patch explorations and the active learning process for training the concept extractor network.

The image patch view portion 501 may be utilized to view an overview of the image patches to help the user quickly explore the data collections and identify interesting visual concepts. The system may utilize t-distributed stochastic neighbor embedding (t-SNE) to the image patches' latent representations to provide a 2D layout. Since directly plotting the image patches according to the projected coordinates will result in severe visual clutter, the system may use a de-cluttering algorithm to layout the image patches in non-overlapping grids while still keep visually similar image patches close to each other. Specifically, the system may partition the canvas area into grids with identical size rectangles. The system may then randomize the image patch sequence. For each image patch, the system may find the grid cell containing the 2D coordinates. If the grid is empty, the system may plot the image patch on the grid. If the grid is already occupied, the layout algorithm will search for the nearest neighbor grids to fill. When no empty grid is available on the screen, the image patch may be hidden temporarily. Navigation operations like zooming in will increase the number of grid cells available. When a different scale is reached, the system may replot the image patch view to allow more image patches to be displayed on the screen. The system may bring similar image patches as close as possible through this layout while reducing visual clutter due to overdraw.

A control panel on top of the image patch view 501 allows users to overlay additional information on the image patches as well as filter the data. When the users first explore the data, it is challenging for them even to know where to start their study. The "cluster" filter of the image patch viewer 501 may provide the user the option to plot only image patches in the selected clusters precomputed using algorithms such as k-means. Users can also choose color overlays or border highlights on the image patches to show information such as ground-truth, model predictions and model accuracy. For example in the image patch view 501, for an image segmentation model, the visualization displays pixel-wise image segmentation accuracy where red indicates the wrong prediction and blue indicates the right prediction. In another example shown in FIG. 4, the visualization may utilize a border color to indicate whether the source image of a super-pixel is correctly classified in an image classification model. With different overlays, users can focus on particular image patches to extract the relevant visual concept. For example, the user may be interested in image patches related to wrong predictions and extracting visual concepts from those image patches could better benefit model diagnostics.

As a crucial component in the active learning process, the control panel may also include a range slider 504 to help users efficiently filter the data based on the concept confidence score of each image patch for the concept currently being trained. The user can also draw the concept confidence score as the border color of the image patches in a diverging color scheme.

The training view 505 provides a frontend to control the active learning process. The training view 505 or labeler may contain two parts, a patch details & interaction area 520 for the user to assign concept labels and a training samples list 521 for showing selected images and their training status. The selected image patch from the image patch view may be magnified, and the related information will be presented such as the source of the image patch. In one embodiment, the user can directly add any patch that doesn't contain the concept into the negative training set by selecting on the context menu. To add positive samples, the user may either crop a rectangle on the image that contains the concept and discards the rest of the pixels, or directly selects the whole image patch/super-pixel as a positive sample. All the selected positive and negative samples will be displayed in the training samples list 521. Concepts can be named and saved for use in future sessions. While the active learning network is trained, the user can continue adding different image patches into the training set, or end that training stage, save the concept extractor network and the retrieved images containing the concept.

The system may also utilize the learned visual concepts to compare different models visually. For the two selected models from a list, we compute their confusion matrices for each of the visual concepts and then directly calculate the difference between them. The differences are displayed using a diverging colormap, where red indicates negative values and blue indicates positive values in the matrix. If a second model has better performance than the first one, the diagonal entries should show more positive values (blues) in the matrix and vice versa. For example, in FIG. 8 at section (b) the system may compare DenseNet to ResNet on images containing the visual concept sky. Since there are more red colored entries on the diagonal, we can conclude that DenseNet has worse performance on this set of images. Such comparison reveals the strength and weaknesses of each model and helps identify opportunities to use model ensembles to improve prediction accuracy.

The model summary view 509 may show basic information like the datasets and the model types. We use both bar charts and confusion matrices to show model performance on different classes. A cross-filter view 503 may show the distribution of image patches based on different features, supporting quick retrieval and comparisons. In this view, each image patch could be treated as a multivariate data sample, including variables like prediction accuracy and concept confidence scores for the existing concept extractors. A bar chart may be displayed for each of these variables. To help the user quickly identify an interesting target and generate new facts, the crossfilter view may also connected with the image patch view in certain embodiments. Only the selected image patches in the crossfilter will be plotted in the image patch view. These concept filters can help the user quickly identify confident or confused image patches for different concepts. It is particularly useful when the user has trained multiple visual concepts and would like to study how the learned concepts correlate with each other.

The user interface may utilize the learned visual concepts to support fine-grained model interpretation, diagnostics and comparison 507. After a user completes a new concept extractor's training process, ConceptExtract shows the record of this concept in this area, including the concept name and the image patches with the highest confidence scores. A barchart shows TCAV scores for each visual concept, and the length of each bar indicates the importance of this concept for predicting a specific class. To gauge a potential weakness of the model being analyzed with respect to the concepts, the system may utilize for each concept the top 50 image patches based on the concept confidence score, find the original images of these image patches, and compare predictions of our target model with the ground-truth using a confusion matrix. Each row in the confusion matrix represents the ground truth class, and each column represents the predicted class. The values on the matrix diagonal show the proportion of the data samples correctly classified in each class. The system may use a sequential color map to encode the proportion ranging from 0 to 1. With the confusion matrices, the user can analyze whether the presence of a certain visual concept in the image leads to more model errors. An example is shown in example 523, where the model being analyzed has worse performance on images containing the shadow concept.

The system may design separates of the frontend for data visualization and the backend for data storage and active learning. For the backend of the system, the system may use Pytorch to implement the target machine learning models including DenseNet-FCN and ResNet-101, as well as other models for comparison including DeepLabV3+, DenseNet, VGG, and other similar models. The system may also use Pytorch to implement and train the concept extractor networks. To extract visual concepts, all the images may be segmented into small image patches or super-pixels of different sizes. The system may utilize scikit-image (https://scikitimage.org/) for super-pixel extraction. The image patches or superpixels may then be scaled to the same size as the input of the target model. By running them through the target model, the system may extract and save the latent representation of these image patches (or super-pixels) at the selected layer. In one embodiment, all image patches, along with their latent representations, ground-truth labels, predicted labels and (per-pixel) accuracy may be stored in the backend system as binary files in the file system. The application web server may be implemented with Flask in one embodiment. For the frontend design, the system may mainly rely on JavaScript libraries, React and D3 and draw on both SVG and HTML5 Canvas for increased performance.

Figure 6:
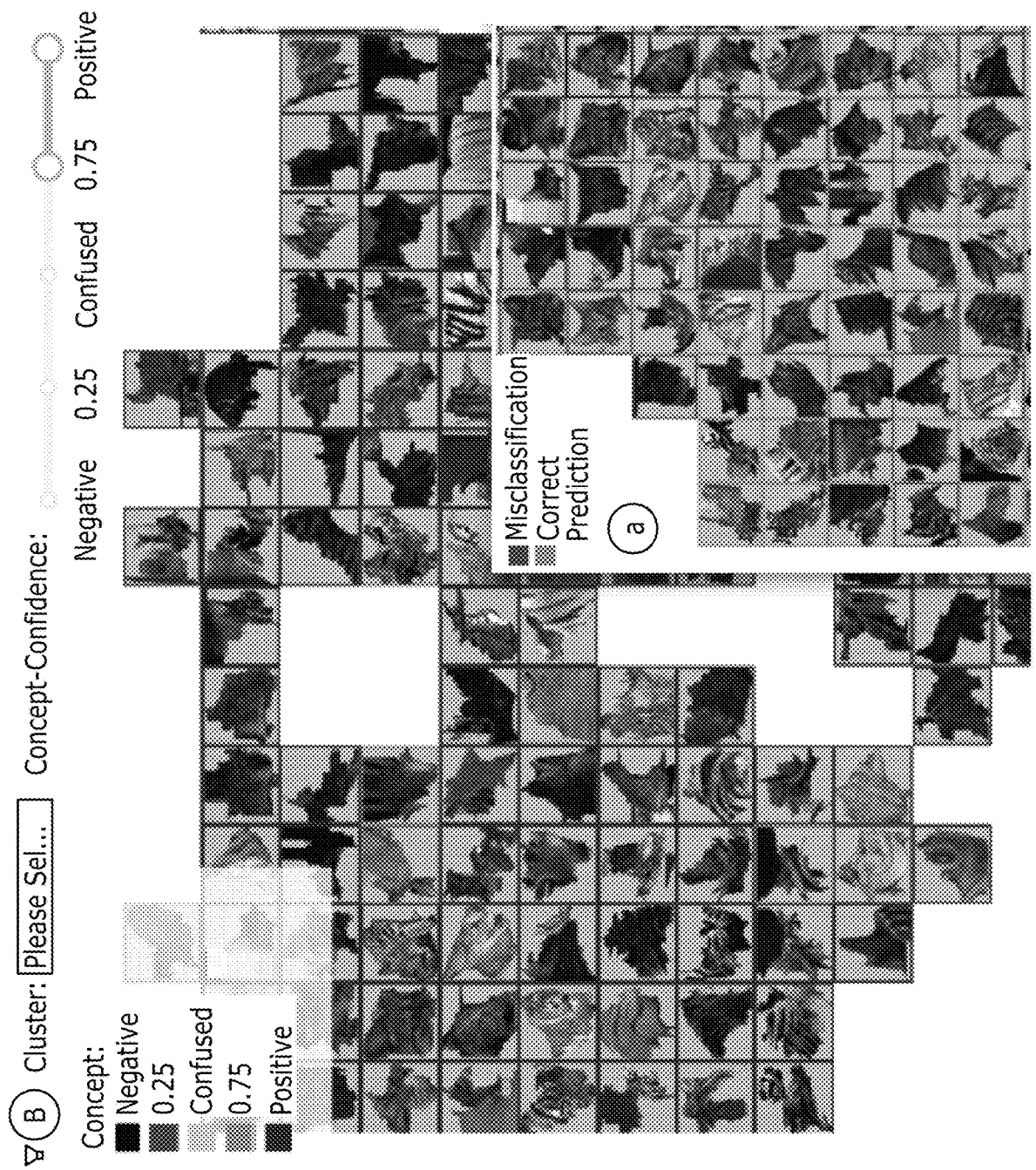
FIG. 6 illustrates a graphical representation of scores and classifications of various attributes.

FIG. 6 illustrates a graphical representation of scores and classifications of various attributes. The user may identify that many stripe patterns are associated with erroneous predictions at section (b). Through active learning the concept extractor network is able to accurately retrieve large amount of super-pixels containing the strip patterns. The stripe concept will be used for further model analysis.

In one embodiment, the concept extractor network (e.g., shown in FIG. 4) may contain only two layers on top of the latent representation extracted from ResNet-101, which may be one convolutional layer and one max pooling layer. A sigmoid function may be applied after the max pooling layer to obtain a concept confidence score between 0 and 1 to predict whether the super-pixel contains the specified visual concept or not. This architecture may be accurate enough for identifying concept images, and training such a network will not take the user a lot of waiting time. For each stage, the neural network may be trained until the validation loss does not decrease. For example, in most cases the training may stop at around 10 epochs. The weights in the concept extractor network may be updated (and not the task model under analysis). The concept confidence scores are sent to the frontend after the training is done. They are displayed in the image patch view and can also be used to filter the image patches to find the most informative examples to label. To obtain more training data, the system may generate a number of images (e.g., 200 images) for both positive and negative training sets by data augmentation. The images may be generated by first randomly sampling from the available training data and then applying the data augmentation strategy.

Figure 7:
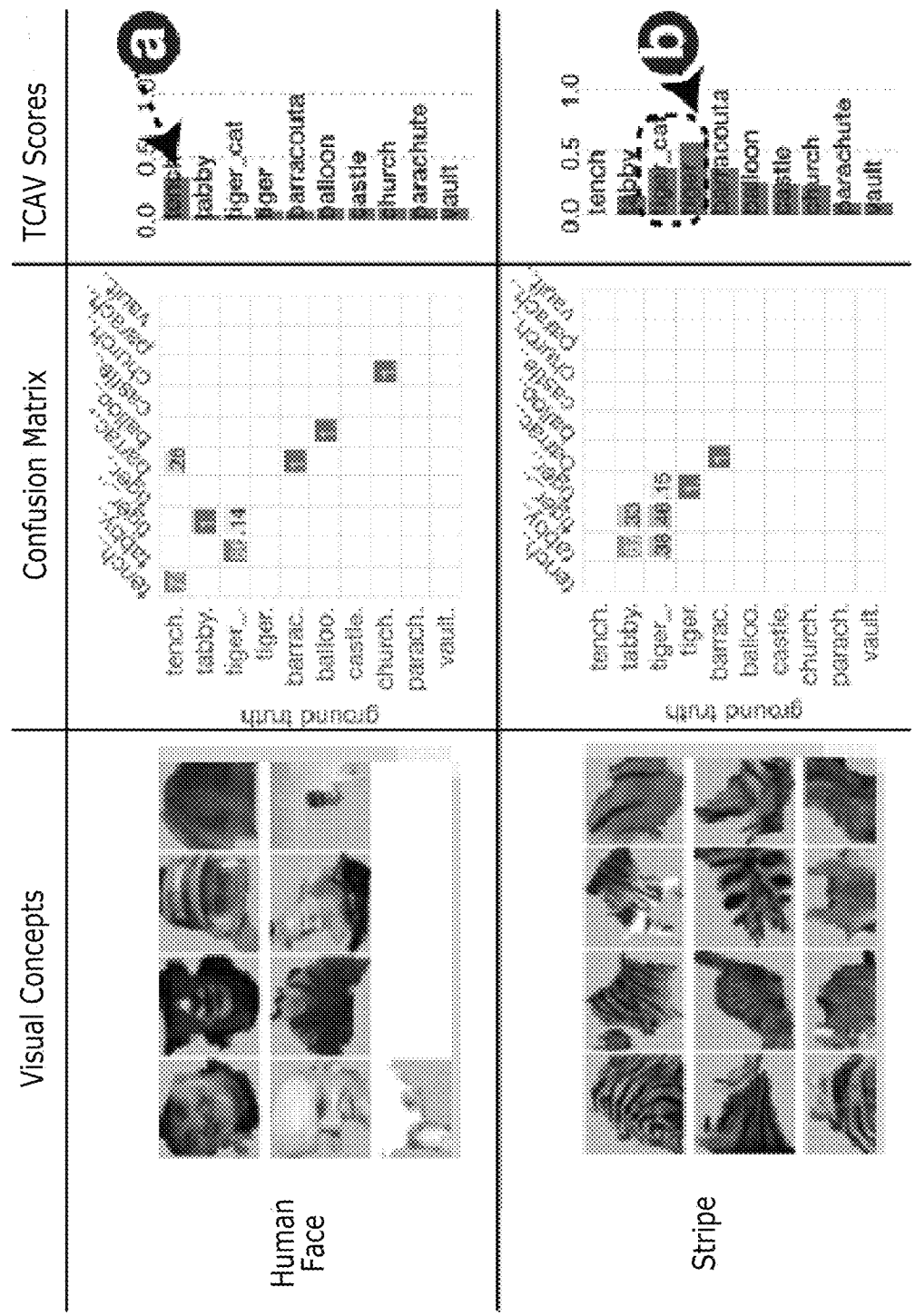
FIG. 7 illustrates a graphical representation of various stripes patterns associated with predictions of the system.

FIG. 7 illustrates a graphical representation of various stripes patterns associated with predictions of the system. The TCAV score may show that the human face is surprisingly important for identifying the class "tench", which is a type of fish. The stripes may be an important visual concept for identifying tiger cat and tiger. Thus, this may be a reason that these two classes are often confused with each other.

The system, in one embodiment, may be configured to extract visual concepts. The system may initially display all the super-pixels in a compact layout, generated from a t-SNE projection of the latent representation. The layout may place semantically-similar super pixels in clusters that can have associated concepts, such as grass and sky, etc. To prioritize finding concepts that affect model performance, the user may be able to overlay predictive accuracy for each super-pixel. For example, one can observe a cluster of super-pixels showing orange and black strip patterns may lead to misclassification. The user may therefore start creating a new visual concept "orange and black stripe" by adding new labeled examples. After specified 4 to 5 positive and the same number of negative samples, the user can click on the "Train" button in the Labeler to start the first training stage for this concept extractor. The training time depends on the dimension of the latent representation and the GPU configuration. On a machine with a GTX 1070Ti GPU, it may typically takes about 50 seconds to train one stage. Based on the returned concept confidence score, the user can use the filter to select more informative examples to label, especially hard negative samples which are confidently but wrongly classified by the concept extractor. After several iterations, the user finds that almost all the super-pixels filtered with a range of high concept confidence score (e.g. 0:75-1:0) contains orange and black stripe patterns and all the super-pixels filtered with low and medium concept confidence scores (e.g. 0:0-0:5) do not contain the stripe patterns. Therefore the user can consider the concept extractor network has successfully learned the orange and black strip concept and use it for model analysis and comparison.

The user may continue exploring the image patch viewer and create new visual concepts following a similar process. For each new visual concept, an individual concept extractor network may be created and trained. For example, the user may train four separate concept extractor networks to identify visual concepts, including human face, fish, stripes, and sky.

From the TCAV scores, the system may identify that the human face concept is highly relevant for predicting the class tench, a type of fish. Since the training data contains a lot of images of person holding tench, both models automatically make use of such visual concept to perform classification. Based on the TCAV scores, it can be observed that the three frequency confused classes tiger cat, tiger, and tabby cat may all uses stripes as a visual concept to perform classification, as shown in FIG. 7. The confusion matrix may show that on images containing stripes, the model may often make mistakes among the three types of feline animals.

Figure 8:
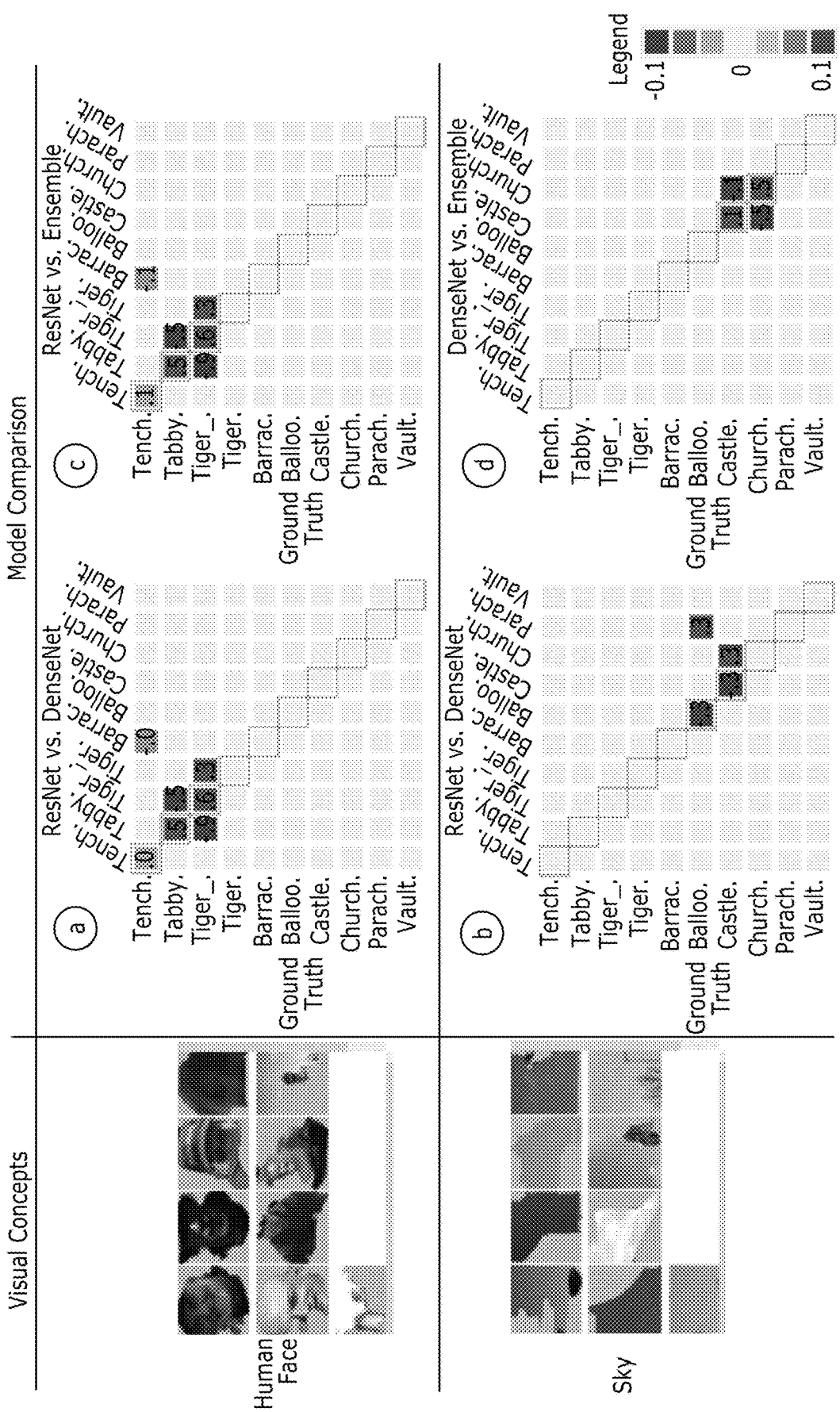
FIG. 8 illustrates one or more confusion matrices.

FIG. 8 illustrates one or more confusion matrices. The confusion matrices may show pairwise model comparison, with fine-grained information about which model performs better on images containing a given concept or image attribute, such as human face or sky. For example, DenseNet may perform better than ResNet on images containing human faces (a) but worse on images containing sky (b). Thus, each type of model may work differently depending on the specific attributes or concepts that the image is looking to identify. The two models may show complementary strength, suggesting that a model ensemble averaging their predictions outperforms both (c and d).

Thus, the system may allow an easy comparison of different models. The visual concepts or attributes extracted can be reused to obtain a fine-grained comparison between different models, which goes beyond simple benchmarks such as overall model accuracy. In particular, the system can analyze which model is better at classifying images containing a certain concept. In this example, the user may load another state-of-the-art model DenseNet to compare it with ResNet-101. Based on the confusion matrix the user observes that while DenseNet performs better than ResNet-101 on images containing visual concepts, such as human-face, it makes more mistakes on images containing the sky concept (e.g. shown in FIG. 7 at (a)(b)). Based on such observation, the user hypothesizes that combining DenseNet and ResNet-101 may result in a stronger model. To verify such a hypothesis, the system and method may construct a simple ensemble model which takes the prediction (in the form of class probability) from both DenseNet and ResNet-101 and average the results to obtain the final class prediction. The system and method may compare the ensemble model with DenseNet and ResNet-101 and observe that it indeed corrects the miss-classification of both models (FIG. 6(c)(d)). The system may further verify the results by comparing the overall accuracy on the ten classes and found that the ensemble model achieves 81:8% accuracy that outperforms both DenseNet (80:0%) and ResNet-101 (80:5%).

ConceptExtract may analyze an image semantic segmentation model for detecting unexpected objects on the road, which may include lost cargo or any other objects. The model may be trained and tested on the public lost cargo dataset. By utilizing such an approach, it may show that the model designers can obtain concepts that are both customized and human understandable. They can further utilize the insights generated from the concept to diagnose the model and improve model performance.

The lost cargo challenge may address the problem of detecting unexpected small obstacles on the road often caused by lost cargo. To achieve this goal, a Fully Convolutional Network (FCN) with a DenseNet Encoder and Pyramid Scene Parsing (FIG. 3(B)) may be trained. This type of model may be noted as DenseNet-FCN.

DenseNet-FCN may perform semantic image segmentation by predicting a label for each pixel in the image. In this case, each pixel could belong to three different classes, including lost-cargo (obstacles), road, and background. As shown in FIG. 3(B), to extract the latent representations for concept learning, the system may select the layer at the beginning of the decoder (dimension: 512×32×64) for two reasons: (i) the layer encodes both local and global information, (ii) the layer has the most compact size, which will benefit future computation and storage.

For this example, since the model designers may want to keep the context of potential concepts, the system may use rectangle boxes with three different sizes to obtain image patches for extracting concepts instead of segmenting the image into super-pixels. Since there are a large number of image patches (over 4 million), the system may sample a subset of them for analysis.

Furthermore, since the main task is to detect the lost cargo on the road, a user may be able to chose all the image patches containing lost cargo (roughly 1000) and sample around 1000 image patches containing the other two labels: road and background. In all, there may be 2533 image patches for concept extraction and visualization.

The lost cargo may have two types of pixel annotations, the coarse pixel annotations including lost cargo(obstacle), road, and background; and the fine pixel annotations for distinguishing specific lost cargo objects/obstacles in the images (e.g., boxes, balls, etc.). The coarse annotations may be used by DenseNet-FCN for training and prediction. To quantitatively evaluate our concept extraction model, the system may use the fine annotations as groundtruth visual concepts. The system may pick a concept—dogs and trained the concept classifier for four iterations. Ten positive and ten negative images may be selected for the initial stage, and for each of the rest stages, four positive and four negative images may be added. The results are shown below in FIG. 9. The figure may plot the precision of the concept extractor when retrieving top-k image patches according to the concept confidence score. For each active learning stage, the system may see a significant improvement in the precision of the predictions after the active learning process, especially for the top 50 image patches based on the concept score.

As shown in FIG. 5 at the image patch viewer 501, to prioritize the visual concepts that affect model performance, the user overlays the pixel accuracy of the model prediction on each image patch. While exploring these image patches, the user may identify that sometimes the lost cargo cannot be correctly detected when it is under a tree shadow, such as that shown in FIG. 5. The system may want to determine if this is just a coincidence, or is it happening across the entire dataset. To answer this question, the user may create the visual concept named "shadow". The user may also have the ability to start specifying positive and negative samples for the concept extractor to learn to retrieve similar image patches also containing shadow. The training process may also utilizes the data augmentation strategy described above. The data augmentation process generates images (e.g., 200+) for both positive and negative training sets.

The model analysis result of "shadow" may be displayed in FIG. 5 at model analysis section 523, together with some other concepts or attributes 507. From the confusion matrix, the user can verify that the DenseNet-FCN model may perform worse (or better in other scenarios) on the images containing "shadow" images compared to images containing other concepts such as standard objects. Meanwhile, the TCAV score indicates that the "shadow" pattern influences the prediction of all three segmentation labels (in the image segmentation model, the system may consider each pixel as an individual data sample to compute the TCAV score). To validate this hypothesis, the system may augment the training set with artificially-generated shadows. The system may randomly draw a boundary line across the lost cargo's bounding box. On a random side of the line, the system may apply a brightness reduction. To make the shadow more realistic, the system may gradually change the darkness around the boundary with Gaussian blur. As shown in Table 1, the fine-tuned model after augmentation may be more accurate. To further verify this strategy's scalability, the system may also apply the shadow augmentation to another state-of-art model, DeepLabV3+ and see an improvement for IoU accuracy as well.

TABLE 1

| Model | Road (%) | Lost Cargo (%) | Others (%) |
| --- | --- | --- | --- |
| DenseNet-FCN-B | 75.8 | 50.6 | 95.4 |
| DenseNet-FCN-SA | 83.6 (0.1) | 53.1 (0.5) | 96.8 (0.0) |
| DeepLabV3+-B | 82.8 | 57.4 | 96.8 |
| DeepLabV3+-SA | 82.8 (0.5) | 58.6 (0.3) | 96.8 (0.1) |

The system may have potential for collecting similar edge cases (like object under shadows) where the model frequently makes mistakes. The visual concepts collected provide a good way to cluster the edge cases, reason about them, and develop corresponding mitigation strategies (such as adding artificial shadow augmentation).

Figure 9:
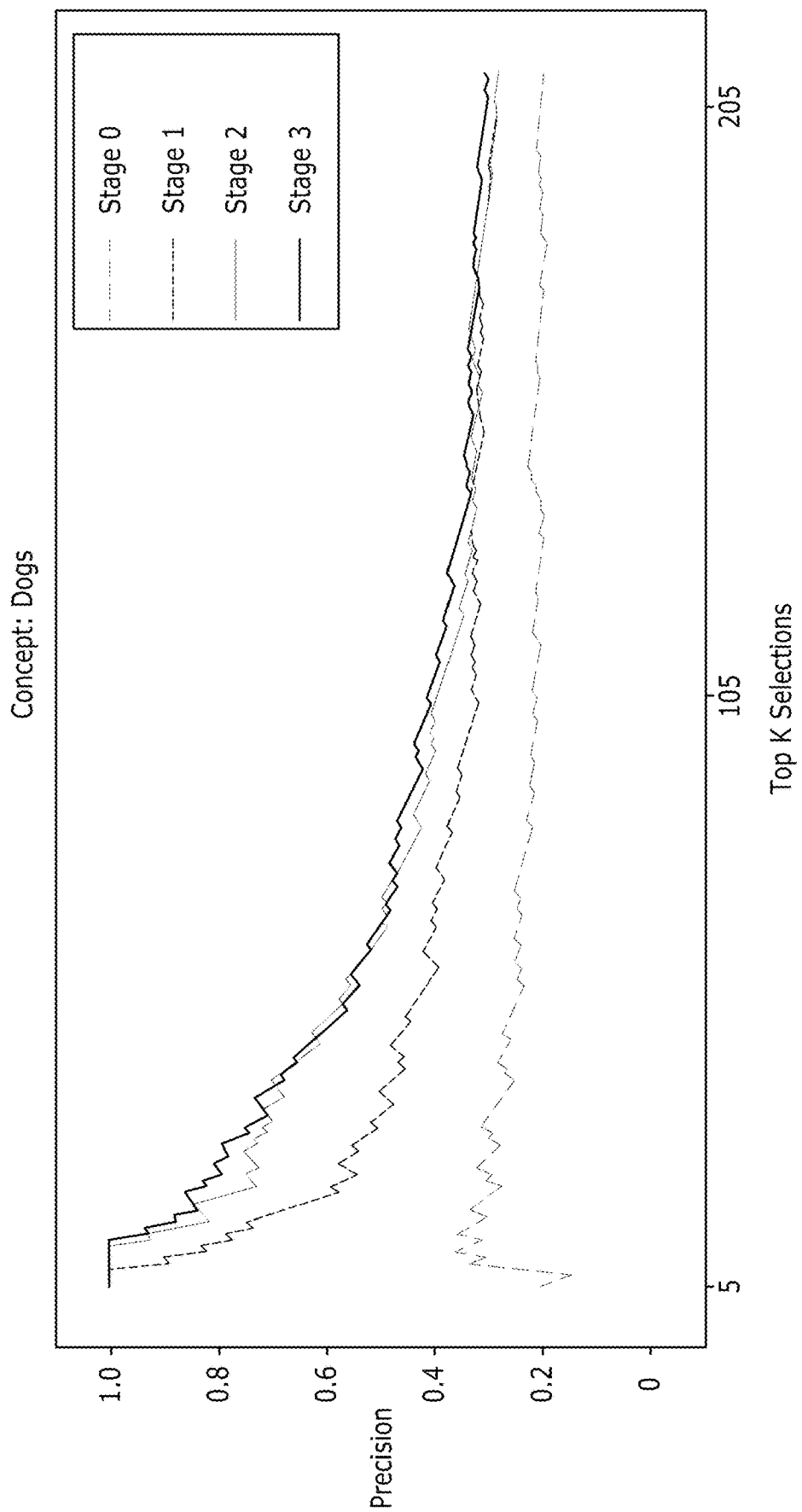
FIG. 9 illustrates a graph showing curves related to "dogs" in the concept extractor network.

FIG. 9 illustrates a graph showing curves related to "dogs" in the concept extractor network. The fine annotations available in the dataset may be used as the ground truth. The top k selections are made based on the concept confidence score. From the initial stage 0 to the final stage 3, the system may observe a significant improvement in the precision value especially for the top selections, validating the effectiveness of the active learning process and the usability of the concept extractor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method, comprising:
receiving one or more images from one or more sensors;

creating one or more image patches utilizing the one or more images, wherein the patches are segmented utilizing fixed window sizes or super-pixel segmentation algorithms;

creating one or more latent representations from the one or more image patches via a neural network;

outputting, to a concept extractor network, the one or more latent representations utilizing the one or more image patches, wherein the concept extractor network is in communication with the neural network and configured to identify patches that contain a common concept, and the concept extractor network is further trainable via a user interface configured to manually label one or more informative examples associated with the one or more images configured to prioritize impact training on the neural network;

defining one or more scores associated with the one or more latent representations, wherein the scores are defined by the concept extractor network and the scores indicate one or more concepts retrieved from the one or more image patches, wherein scores of the one or more informative examples that are manually labeled are prioritized; and outputting, to the user interface, one or more scores associated with the one or more image patches utilizing at least the concept extractor network, wherein the user interface includes scores associated with a first model and a second model, wherein the second model is different from the first model based on at least weights or architecture.

2. The method of claim 1, wherein the method includes outputting the user interface at a display, wherein the user interface includes at least an image patch viewer.

3. The method of claim 1, wherein the method includes outputting the user interface at a display, wherein the user interface includes at least a portion outputting positive samples and negative samples associated with the one or more images.

4. The method of claim 1, wherein the method includes outputting the user interface at a display, wherein the user interface includes a training sample list that includes one or more savable attributes.

5. The method of claim 1, wherein the concept extractor network is configured to output a confidence score associated with the one or more latent representations.

6. The method of claim 1, wherein the concept extractor network includes exactly two layers.

7. The method of claim 1, wherein the neural network is configured to classify the one or more image patches.

8. The method of claim 1, wherein the concept extractor network is configured to be trained utilizing at least the one or more images or image patches.

9. A computer-implemented method, comprising:

receiving one or more images from one or more sensors;

creating one or more image patches utilizing the one or more images, wherein the patches are segmented utilizing fixed window sizes or super-pixel segmentation algorithms;

resizing the one or more images to an input scale to create re-sized images;

sending the one or more image patches to a neural network to define one or more latent representations;

outputting, to a concept extractor network, one or more latent representations utilizing the one or more image patches and a plurality of models associated with the concept extractor network, wherein the concept extractor network is configured to identify patches that contain a common concept and the concept extractor network is trainable via a user interface configured to manually label one or more informative examples associated with the one or more images; and outputting, to a user interface, one or more scores associated with the plurality of models associated one or more attributes of the image patches utilizing the concept extractor network, wherein the user interface includes scores associated with a first model and a second model, wherein the second model is different from the first model based on at least weights or architecture.

10. The computer-implemented method of claim 9, wherein the method includes outputting one or more attributes associated with the one or more latent representations.

11. The computer-implemented method of claim 10, wherein the one or more attributes are associated with the plurality of models.

12. The computer-implemented method of claim 10, wherein the one or more attributes are associated with representative attribute images retrieved from the one or more images.

13. The computer-implemented method of claim 10, wherein the method includes receiving, from a user, input associated with one or more attributes associated with the image patches.

14. A system, comprising:

a processor in communication with a display, the processor programmed to:

receive one or more images from one or more sensors;

create one or more image patches utilizing the one or more images a wherein the patches are segmented utilizing fixed window sizes or super-pixel segmentation algorithms;

resizing the one or more images to an input scale to create re-sized images;

send the one or more resized images to a neural network to define one or more latent representations utilizing the one or more image patches;

output, to a concept extractor network, one or more latent representations utilizing the one or more image patches and a plurality of models associated with the concept extractor network, wherein the concept extractor network is configured to identify patches that contain a common concept, and the concept extractor network is further trainable via a user interface configured to manually label one or more informative examples associated with the one or more images; and output, to a user interface on the display, one or attributes associated with the one or more image patches and the plurality of models; and output one or more scores associated with the plurality of models associated one or more attributes of the image patches utilizing the concept extractor network, wherein the user interface includes scores associated with a first model and a second model, wherein the second model is different from the first model based on at least weights or architecture.

15. The system of claim 14, wherein the processor is further programmed to output one or more confidence scores associated with the one or more attributes and further programmed to prioritizing scoring of the one or more informative examples that are manually labeled.

16. The system of claim 14, wherein the user interface is configured to activate one or more filters associated with the one or more image patches.

17. The system of claim 14, wherein the one or more image patches include a first section with a first set of attributes and a second section with a second set of attributes.

18. The system of claim 14, wherein the one more sensors includes one or more cameras.

19. The system of claim 14, wherein the user interface outputs one or filters associated with the one or more attributes.

20. The system of claim 14, wherein the user interface includes one or more training sampling lists that includes one or more editable attributes.

* * * * *